(12) United States Patent  
Hartung et al.

(10) Patent No.: US 9,143,728 B2  
(45) Date of Patent: Sep. 22, 2015

(54) USER INTERFACE CONTROL IN A MULTIMEDIA CONFERENCE SYSTEM

(75) Inventors: Frank Hartung, Herzogenrath (DE); Laurits Hamm, Aachen (DE); Markus Kampmann, Andernach (DE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 38 days.

(21) Appl. No.: 14/345,867

(22) PCT Filed: Sep. 19, 2011

(86) PCT No.: PCT/EP2011/066237  
§ 371 (c)(1),  
(2), (4) Date: Mar. 19, 2014

(87) PCT Pub. No.: WO2013/041121  
PCT Pub. Date: Mar. 28, 2013

(65) Prior Publication Data  
US 2014/0218464 A1 Aug. 7, 2014

(51) Int. Cl.  
*H04N 7/14* (2006.01)  
*H04N 7/15* (2006.01)  
*G06F 3/0481* (2013.01)

(52) U.S. Cl.  
CPC ............ *H04N 7/15* (2013.01); *G06F 3/0481* (2013.01); *G06F 2203/04802* (2013.01); *G06F 2203/04803* (2013.01)

(58) Field of Classification Search  
CPC ...................................... H04N 7/14

USPC ........... 348/14.01, 14.03, 14.07, 14.12, 14.08  
See application file for complete search history.

(56) References Cited

U.S. PATENT DOCUMENTS

| 6,744,460 | B1 | 6/2004 | Nimri et al. |
| 7,768,543 | B2 * | 8/2010 | Christiansen ............ 348/14.08 |
| 2002/0093531 | A1 | 7/2002 | Barile |
| 2009/0009587 | A1 | 1/2009 | Lindbergh |
| 2011/0093273 | A1 | 4/2011 | Lee et al. |

FOREIGN PATENT DOCUMENTS

| JP | 7336660 A | 12/1995 |
| WO | 2008027724 A1 | 3/2008 |
| WO | 2009137260 A2 | 11/2009 |
| WO | 2011112640 A2 | 9/2011 |

* cited by examiner

*Primary Examiner* — Olisa Anwah  
(74) *Attorney, Agent, or Firm* — Rothwell, Figg, Ernst & Manbeck, P.C.

(57) ABSTRACT

A device for use in a multimedia conferencing system comprises an audio analysis processor (340), a session type classification processor (310) and a user interface controller (300). The audio analysis processor (340) is configured to analyze audio data of a communication session with multiple participating endpoints. The session type classification processor (310) is configured to determine a type of the communication session on the basis of the analysis of the audio data. The user interface controller (300) is configured to control a representation of the endpoints in a user interface on the basis of the determined type of the communication session, e.g., by sending control data (CD) to the endpoints.

17 Claims, 7 Drawing Sheets

USER INTERFACE CONTROL IN A MULTIMEDIA CONFERENCE SYSTEM

CROSS REFERENCE TO RELATED APPLICATION(S)

This application is a 35 U.S.C. §371 National Phase Entry Application from PCT/EP2011/066237, filed Sep. 19, 2011, designating the United States, the disclosure of which is incorporated herein in its entirety by reference.

TECHNICAL FIELD

The present invention relates to methods for user interface control in a multimedia conference system and to corresponding devices.

BACKGROUND

Multimedia conference systems allow multiple endpoints to interact by exchanging audio and typically also video data. Endpoints of such multimedia conference systems may for example be computer systems. At each endpoint, a user interface (UI) is presented to the user or users. The UI may display visual information and also output audio information of a communication session established by the multimedia conference system. The visual information typically includes video images recorded at the different endpoints. Similarly, the audio information typically includes sounds recorded at the different endpoints, e.g., the voice of a person participating in the multimedia conference.

A multimedia conference system may also be implemented in a mobile network. In such cases, one or more endpoints may be formed by a user equipment (UE) connected to the mobile network. In a mobile network, a multimedia conference system may be implemented on the basis of the Internet Protocol Multimedia Subsystem (IMS). In such an IMS based multimedia conference system, an entity termed as Media Resource Function (MRF) is used to control media properties, such as sizes and bitrates of video and audio streams distributed between the endpoints. The MRF may also determine the way in which the endpoints are represented in the UIs at the endpoints, e.g., by determining which endpoint is represented by a large video image on the UI and which endpoint is represented by a small video image on the UI. The MRF may be split into a control part, referred to as MRFC, and a processing part, referred to as MRFP.

The layout as used at the endpoints for representing the endpoints may be statically configured. However, such a statically configured UI may sometimes be inadequate for certain communication scenarios. Further, it is also known to allow manual selection between predefined layouts by the user or manual configuration of the layout by the user. However, such manual selection or configuration of a suitable layout may cause discomfort to the user.

Accordingly, there is need for techniques which allow for comfortably and adequately controlling the UI of a multimedia conference system.

SUMMARY

According to an embodiment of the invention, a method of controlling a UI of a multimedia conferencing system is provided. According to the method, audio data of a communication session with multiple participating endpoints are analyzed. On the basis of this analysis of the audio data, a type of the communication session is determined. On the basis of the determined type of the communication session, a representation of the endpoints in the UI is controlled.

According to a further embodiment of the invention, a device for use in a multimedia conferencing system is provided. The device comprises an audio analysis processor, a session type classification processor and a UI controller. The audio analysis processor is configured to analyze audio data of a communication session with multiple participating endpoints. The session type classification processor is configured to determine a type of the communication session on the basis of the analysis of the audio data. The UI controller is configured to control a representation of the endpoints in a UI on the basis of the determined type of the communication session.

According to further embodiments, other methods, devices, or computer program products for implementing the methods may be provided.

DETAILED DESCRIPTION OF EMBODIMENTS

In the following, the invention will be explained in more detail by referring to exemplary embodiments and to the accompanying drawings. The illustrated embodiments relate to concepts of user controlling a UI of a multimedia conference system implemented in a mobile network, e.g., in a mobile network according to 3GPP TSs. However, it is to be understood that the illustrated concepts may be applied in other types of mobile network and fixed networks as well.

Figure 1:
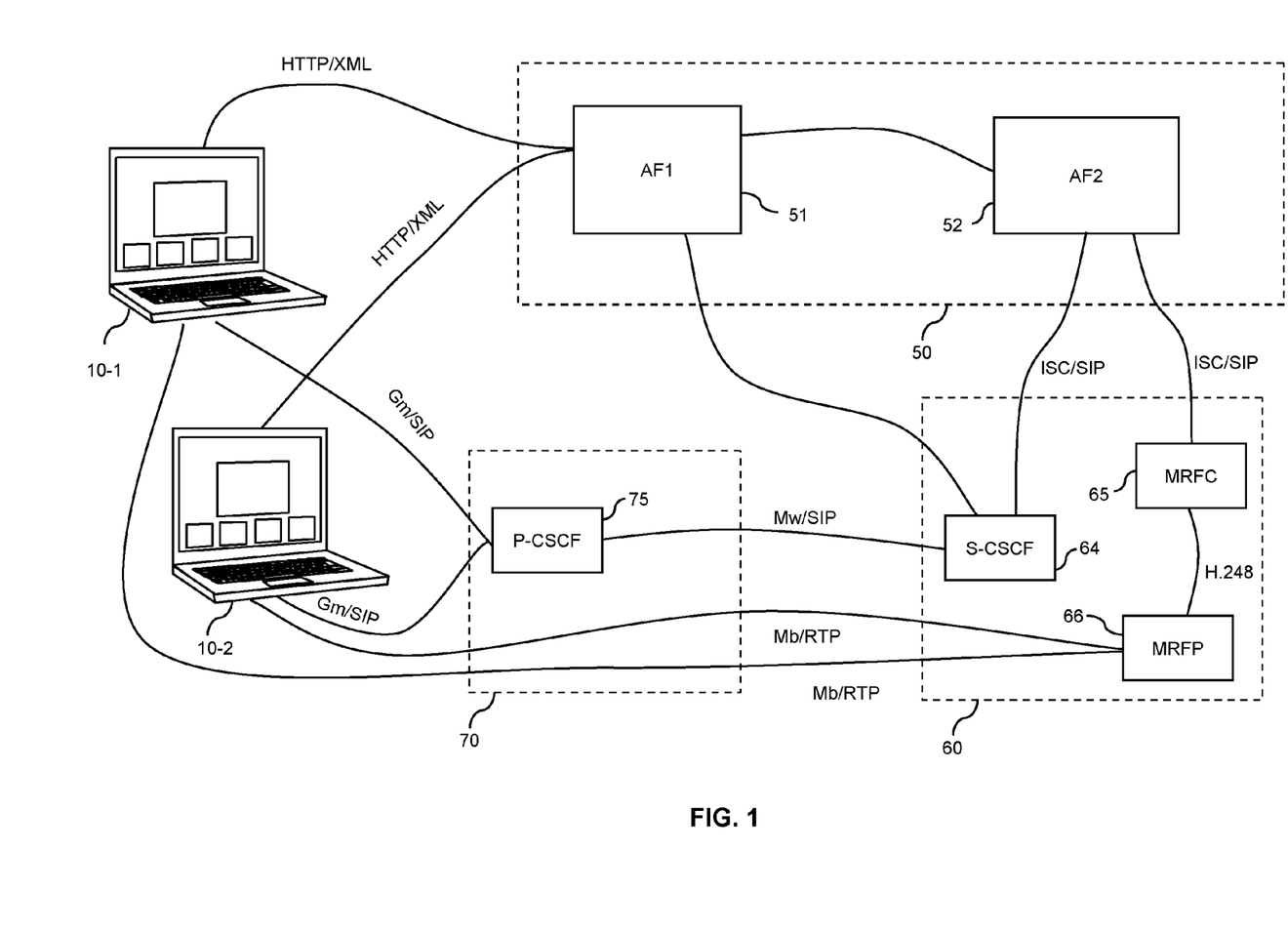
FIG. 1 schematically illustrates a mobile network environment in which concepts according to embodiments of the invention can be applied.

FIG. 1 schematically illustrates a mobile network environment in which concepts according to embodiments of the invention can be applied. More specifically, FIG. 1 shows an IMS based implementation of a multimedia conference system in a mobile network according to the 3GPP TSs.

As illustrated, the mobile network includes an IMS application section 50, an IMS core section 60, and an IMS access section 70. The IMS application section 50 includes a number of application functions, in particular a first application function (AF1) 51, and a second application function (AF2) 52. The IMS core section includes a Serving Call Session Control Function (S-CSCF) 64, a MRFC 65, and a MRFP 66. The IMS access section 70 includes a Proxy Call Session Control Function (P-CSCF) 75. In the scenario of FIG. 1, a first UE 10-1 and a second UE 10-2 are connected to the mobile network and form endpoints of a communication session established by the multimedia conference system. However, it is to be understood that the UEs 10-1, 10-2 are merely examples of multiple endpoints participating in the communication session. Any number of endpoints could participate in the communication session, and such endpoints may be formed by any type of UE, e.g., a portable computer or a mobile phone. In typical scenarios, at least three endpoints participate in the communication session. However, it is also possible that only two endpoints participate in the communication session. Further, it is to be understood that the multimedia conference system is not limited to endpoints using access via the mobile network and that endpoints may also participate using fixed access. Also, although FIG. 1 shows the UEs 10-1, 10-2 as using the same access section 70 and P-CSCF 75, the endpoints may use different access sections of the mobile network, e.g., in different regions or hosted by different providers.

The first application function 51 may be a booking application server. The second application function 52 may be a conference application server. The application functions 51, 52 provide functionalities to be used for establishing a communication session of the multimedia conference system. For example, such functionalities may include finding endpoints to be invited to participate in the communication session, booking a communication session, or scheduling the communication session.

As illustrated in FIG. 1, various interfaces and protocols may be used to allow interaction of the nodes of the multimedia conference system. In particular, the Hypertext Transfer Protocol (HTTP) and Extended Markup Language (XML) may be used for interaction between the UEs 10-1, 10-2 and the first application function 51. The IMS Service Control (ISC) interface and the Session Initiation Protocol (SIP) may be used for interaction between the second application function 52 and the S-CSCF 65 and for interaction between the second application function 52 and the MRFC 65. The H.248 protocol may be used for interaction between the MRFC 65 and the MRFP 66. The Mb interface and the Real Time Transport Protocol (RTP) may be used to stream multimedia data as processed by the MRFP 66 to the endpoints formed by the UEs 10-1, 10-2. The Mw interface and SIP may be used for interaction between the S-CSCF 65 and the P-CSCF 75. Further, the Gm interface and SIP may be used for interaction between the endpoints formed by the UEs 10-1, 10-2 and the P-CSCF.

Figure 2:
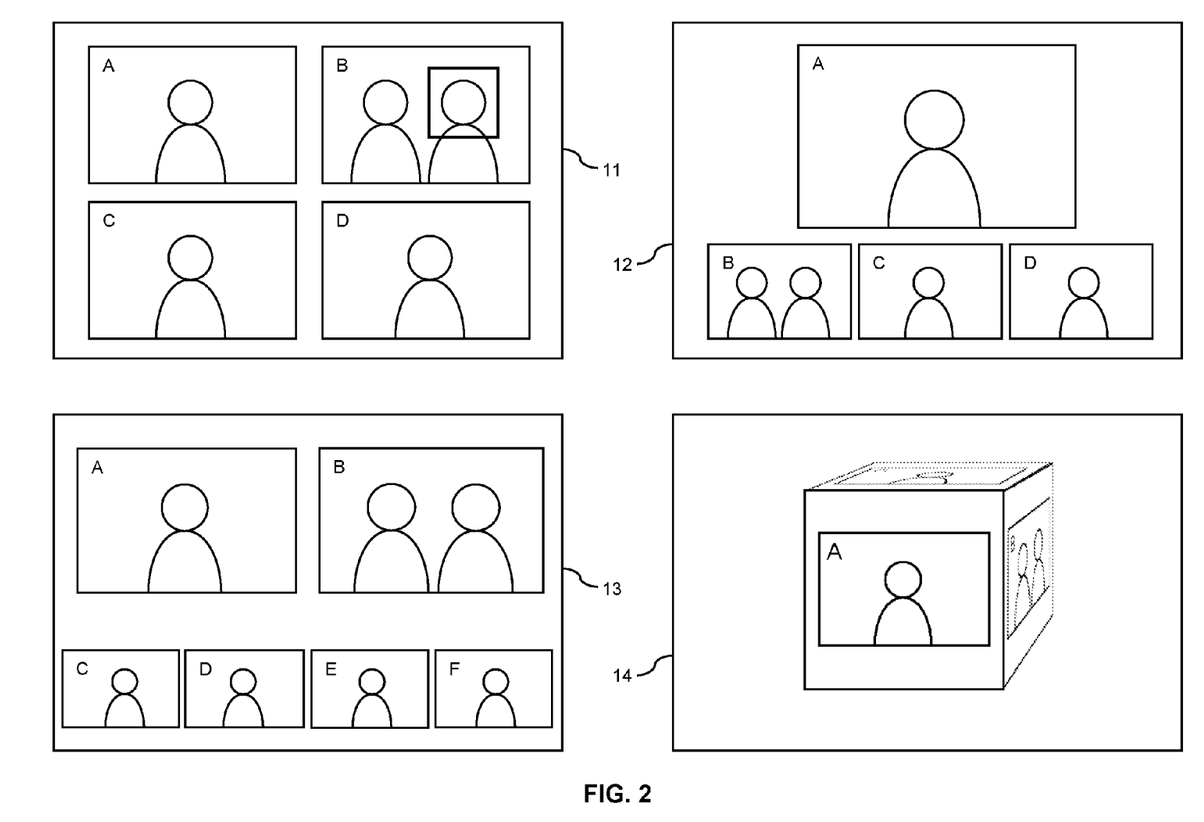
FIG. 2 schematically illustrates examples of screen layouts which may be selected in a UI control method according to an embodiment of the invention.

FIG. 2 shows examples of different visual layouts 11, 12, 13, 14 which may be used in the UI at the endpoints of the communication session. In the layouts, video images corresponding to different endpoints are denoted by A, B, C, D, E, and F. In the illustrated examples, the endpoint at which the UI is shown may for example correspond to the video image D. The video image corresponding to the endpoint at which the UI is shown does not need to be represented in the UI.

Typically, each of the video images A, B, C, D, E, F will show at least one person participating in the communication session. In some cases, as exemplified in video image B, multiple persons may be visible in the video image. In embodiments of the present invention as described in the following, such layouts may be automatically selected according to a type of the communication session, i.e., according to a conversation scenario underlying the communication session. For example, if the type of the communication corresponds to a monologue, i.e., one endpoint is speaking and the others are listening, layout 12 or a similar layout may be selected. On the other hand, if the type of the communication session corresponds to a discussion, i.e., all endpoints are speaking with equal activity, layout 11 or a similar layout may be selected. Further, if the type of the communication session corresponds to a dialogue, i.e., a group of endpoints are speaking and the other endpoints are listening, layout 13 or a similar layout may be selected. In the layout 13, the speaking endpoints are represented with a large video image, whereas the other endpoints are represented with small images. Layout 14 could be used if the type of the communication session corresponds to a group dialogue with alternating speaking endpoints. In the layout 14, a cube is represented in perspective view, and the video images corresponding to the different endpoints are shown on different faces of the cube. In case of layout 14, the presently speaking endpoint could be shown on the front face of the cube, and when the speaking endpoint changes, the cube could be rotated.

The selection of the layout may additionally be based on other criteria, e.g., on the number of participating endpoints. For example, layouts 11 and 12 could be selected when four endpoints are participating.

In the embodiments as explained in the following, the type of the communication session is determined automatically on the basis of an analysis of audio data of the communication session, and the representation of the endpoints in the UI is automatically controlled on the basis of the determined type of the communication session. In this way, a layout for the UI may be selected which is adequate with respect to an underlying conversation scenario of the communication session. For example, it may be distinguished between a monologue type communication session, a discussion type communication session, and a dialogue type communication session. In some embodiments, the representation of the endpoint in the UI may additionally be controlled on the basis of an analysis of video data of the communication session. For example, endpoint with multiple participating persons could be identified on the basis of the video data and/or a speaking person could be highlighted in the representation in the UI.

In some embodiments, the MRFP 66 analyzes and classifies the communication session by applying audio and video analysis. Based on the current analysis and a history of audio and/or video data in the past, the MRFP may recognize the underlying conversational scenario and determine the type of the communication session. Based on this classification of the communication session, the representation of the endpoints in the UI can be controlled in an automated and adequate way.

Figure 3:
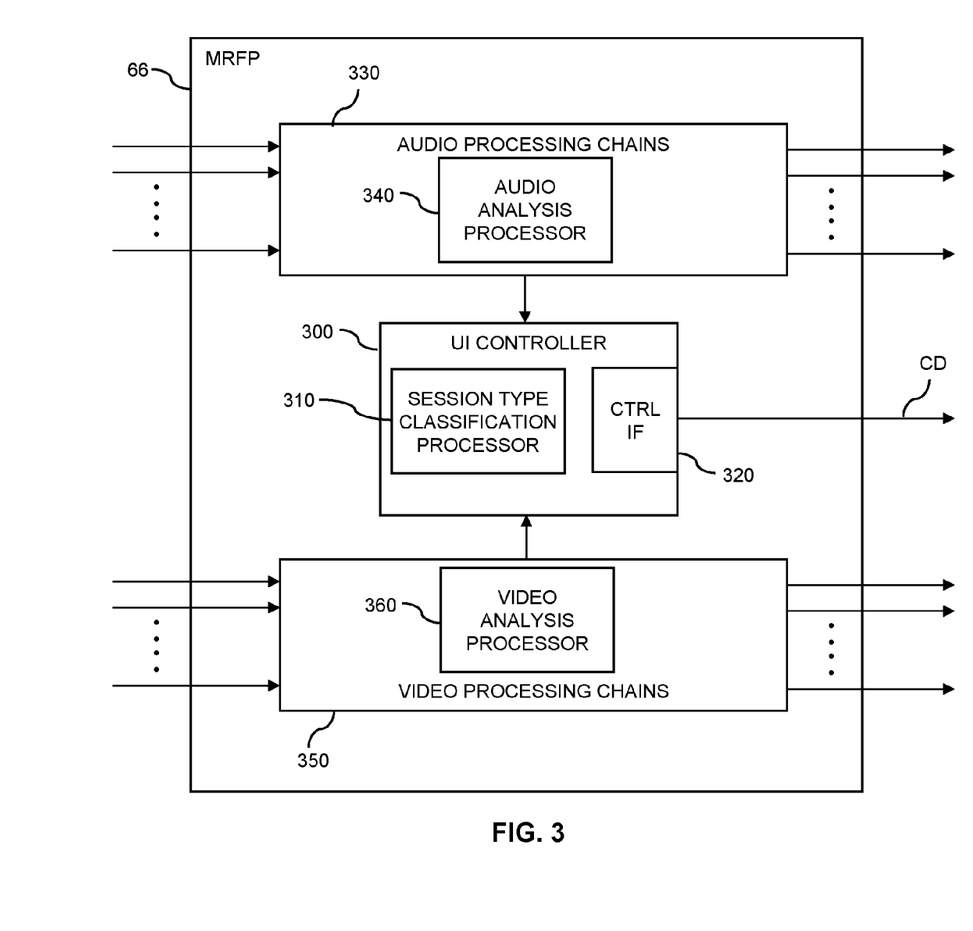
FIG. 3 schematically illustrates a device according to an embodiment of the invention.

FIG. 3 schematically illustrates a device for implementing the above concepts in a multimedia conference system. As illustrated, the device may correspond to the MRFP 66 of FIG. 1. As illustrated, the device includes a UI controller 300 with a session type classification processor 310 for accomplishing the determination of the type of the communication session. In addition, the device is provided with a control interface (CTRL IF) 320 for sending control data CD concerning the representation of the endpoints in the UI to the endpoints of the communication session, e.g., to the UEs 10-1, 10-2 of FIG. 1. In the illustrated implementation, the control interface 320 is implemented within the UI controller 300.

In the illustrated implementation, it is assumed that the device processes audio data of the communication session in the form of multiple streams of audio data, typically one stream of audio data per endpoint. For this processing, the device is equipped with a plurality of audio processing chains 330. In addition, it is assumed that the device processes video data of the communication session in the form of multiple streams of video data, typically one stream of video data per endpoint. For this processing, the device is equipped with a plurality of video processing chains 350.

The audio processing chains 330 include an audio analysis processor 340 for accomplishing the analysis of audio data to be used as a basis for controlling the representation of the endpoints in the UI. As illustrated, the audio analysis processor 340 provides a signal representing a result of the analysis of audio data to the UI controller 300. The audio analysis performed by the audio analysis processor 340 may for example involve measuring an audio activity level in the audio data of each endpoint and sorting the endpoints by the measured audio activity level. The audio activity level is a value representing the activity of the endpoint with respect to audio signals. For example, the audio activity could be based on sound volume. The audio activity level could also be based on determining a relative portion of time in which the audio signal strength of an endpoint exceeds a given threshold. By suitable selection of this threshold, a relative portion of time in which a participating person at the endpoint speaks could be deduced. Accordingly, in some embodiments, not only the present value of the audio signal strength may be monitored in order to determine the audio activity level, but also a history of values of the audio signal strength may be recorded over a certain period of time. The audio analysis processor 340 may then provide the sorted audio activity levels of the endpoints as analysis result to the session classification processor 310 in the UI controller 300.

In order to determine the type of the communication session, the session classification processor 310 may determine whether the audio activity level of the endpoint having the highest activity level is above a first threshold, e.g., of 90%. If this is the case, the session classification processor 310 may conclude that substantially only one of the endpoints is speaking while the others are listening and the communication session corresponds to a monologue type communication session.

In order to determine the type of the communication session, the session classification processor 310 may also determine whether the sum of the audio activity levels of a group of the endpoints having the highest audio activity levels is above a second threshold, e.g., of 90%, and the audio activity levels of each of the endpoints of this group are above a third threshold, e.g., of 30%. If this is the case, the session classification processor 310 may conclude that substantially only a group of the endpoints, i.e., not all endpoints, are speaking while the others are listening and that the communication session corresponds to a dialogue type communication session. Here it is to be understood that a group of two endpoints would correspond to a classical two-party dialogue with additional listeners, but that also larger groups may occur in some scenarios. The dialogue type communication session may for example occur in case of a podium discussion or a joint presentation by multiple parties.

In order to determine the type of the communication session, the session classification processor 310 may also determine whether the difference between the audio activity level of the endpoint having the highest audio activity level and the audio activity level of the endpoint having the lowest audio activity level is below a fourth threshold, e.g., below 30%. If this is the case, the session classification processor 310 may conclude that the audio activity levels of all endpoints are within a certain range and that the communication session corresponds to a discussion type communication session in which all endpoints have similar contributions to the overall audio activity.

The UI controller 300 may then control the representation of the endpoints in the UI by selecting a corresponding visual layout for the UI, e.g., from predefined layouts as explained in connection with FIG. 2, and sending corresponding control data CD to the endpoints. For example, a layout description or layout indication information may be generated. This can for example be an HTML5/CSS based layout description. Alternatively, the visual layout may be signaled using a dedicated protocol.

As further illustrated, the video processing chains 350 may include a video analysis processor 360 for accomplishing the analysis of video data to be used as additional basis for controlling the representation of the endpoints in the UI. The video analysis processor 360 provides a signal representing a result of the analysis of video data to the UI controller 300.

The analysis of the video data as accomplished by the video analysis processor 360 may involve measuring a visual activity level for each of the endpoints. The visual activity level is a value representing the activity in the video image recorded at the endpoint, i.e., an amount of movements in the video image. For example, intensive gesturing of a person could be detected using a gesture recognition algorithm that separates gestures from background movement. The visual activity level may be used as additional input of the session type classification processor 310. For example, the session type classification processor 310 could perform the above determinations of types of communication session on the basis of weighted average values of audio activity level and visual activity level, rather than on the basis of audio activity levels only. The result of the video analysis could be a list of endpoints sorted by visual activity level.

In addition or as an alternative, the analysis of the video data as accomplished by the video analysis processor 360 may also involve determining a speaker among multiple visible persons in the video image recorded at an endpoint. For example, as shown in video image B of FIG. 2, two persons may be visible in the video image. However, only one of these persons may actually be speaking. Determination of the speaker among multiple visible persons may for example be accomplished by performing face recognition and analyzing movement patterns in the video image. Upon determining the speaker, the UI controller 300 may cause the determined speaker to be highlighted in the video image as shown in the UI, e.g., by means of a frame as illustrated in layout 11 for the right person of video image B. Further, the video image could be zoomed to the identified speaker.

In addition or as an alternative, the analysis of the video data as accomplished by the video analysis processor 360 may also involve determining a number of visible persons, e.g., by applying face recognition. The number of visible persons in the video image at an endpoint may be used as an additional basis for selecting an adequate visual layout for the UI. For example, specific layout options could be provided for cases with endpoints showing multiple persons in the video image. One possibility would be to use a larger window for displaying the video image with multiple visible persons, thereby allowing for better recognition of the different persons in the video image.

Figure 4:
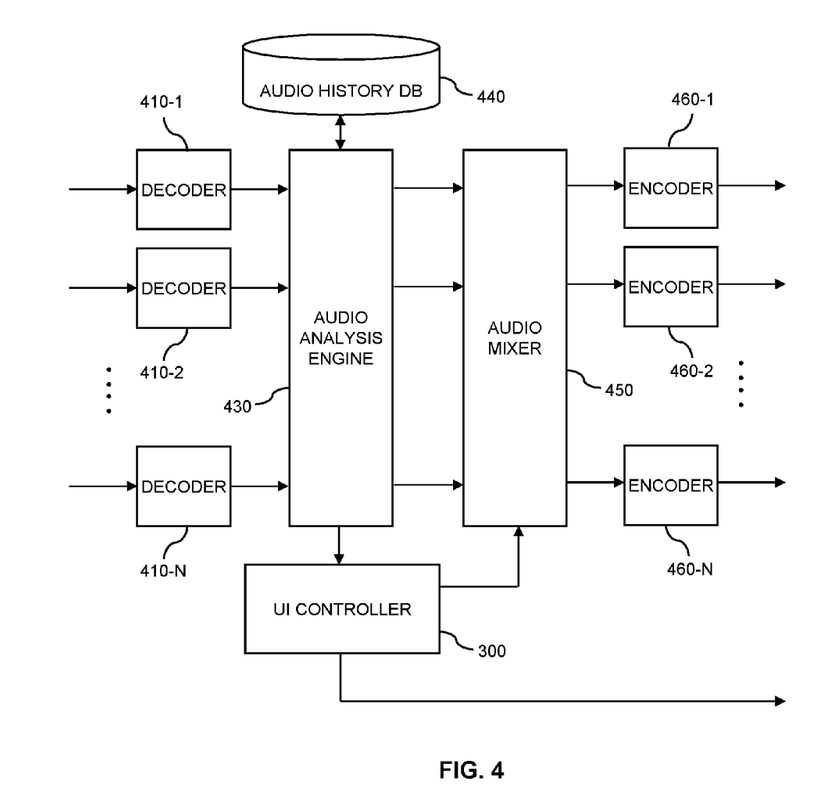
FIG. 4 schematically illustrates an audio processing part of the device.

FIG. 4 shows further details of an implementation of the audio processing part in the device of FIG. 3. More specifically, FIG. 4 illustrates structures of the audio processing chains 330 and the audio analysis processor 340.

As illustrated, each of the audio processing chains includes a decoder 410-1, 410-2, . . . , 410-N for decoding audio data of a stream, e.g., an RTP stream received from an RTP source. The decoders 410-1, 410-2, . . . , 410-N may for example be implemented as G.719 decoders. The decoders 410-1, 410-2, . . . , 410-N decode the audio data to obtain digital audio signals. In some scenarios, these digital audio signals may be multichannel signals, e.g., stereo signals.

The decoders 410-1, 410-2, . . . , 410-N provide the decoded audio signals at their outputs to an audio analysis engine 430, which is part of the audio analysis processor 340 of FIG. 3. As illustrated, the audio analysis engine 430 is coupled to an audio history database (DB) 440, which forms a further part of the audio analysis processor 340 of FIG. 3.

Using the audio history database 440, the audio analysis engine 430 may record the audio signals or parameters evaluated therefrom for a certain period of time and/or over multiple communication sessions in order to maintain a history of the audio signals for each of the endpoints. The histories of the audio signals as maintained by the audio history database may in turn be used by the audio analysis engine 440 when performing the analysis of the audio data, e.g., for determining the audio activity levels. The history of the audio data of past communications sessions may for example be used to provide information on expected audio activity levels already at the beginning of a communication session.

From the audio analysis engine 430, the audio signals are supplied to an audio mixer 450 which mixes the different audio signals to obtain audio signals in which typically contributions from each endpoint are audible. The mixed audio signals are then supplied to encoders 460-1, 460-2, . . . , 460-N of the different audio processing chains. As illustrated, the audio mixer 450 may be controlled by the UI controller 300. In this way, a way of rendering the audio data in the UI may be controlled, e.g., with respect to a multi-channel audio configuration to be used for outputting the audio signals in the UI. For example, if an endpoint was identified as having multiple participating persons, such as by analysis of the video data, the multi-channel audio configuration for outputting the audio signals could be controlled depending on the speaking person. One exemplary scenario of such control would be to use a left audio channel if the identified speaker is located on the left of the video image and to use a right audio channel if the identified speaker is located on the right of the video image. Further, the multi-channel audio configuration could also be controlled depending on the basis of a selected visual layout. Here, if the layout shows a video image of a certain endpoint on the left side, a left audio channel could be used for outputting the audio signals corresponding to this endpoint, and if the layout shows a video image of a certain endpoint on the right side, a right audio channel could be used for outputting the audio signals corresponding to this endpoint. Also suitable mixing between left and right audio channels depending on the position of an identified speaker in the video image or depending on the location of the video image in the visual layout may be used.

The encoders 460-1, 460-2, . . . , 460-N accomplish encoding of the mixed audio signals for transmission to the various endpoints. In particular, the mixed audio signals may be encoded into RTP streams corresponding to the different endpoints.

Figure 5:
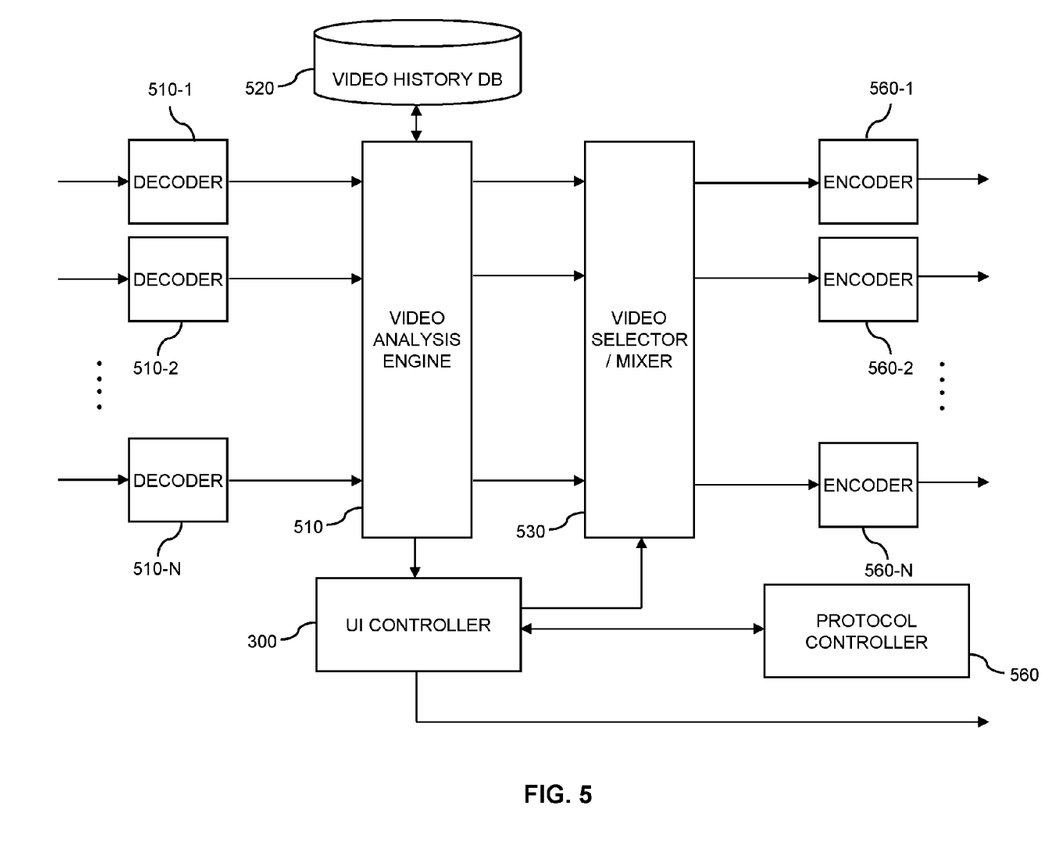
FIG. 5 schematically illustrates a video processing part of the device.

FIG. 5 shows further details of an implementation of the video processing part in the device of FIG. 3. More specifically, FIG. 5 illustrates structures of the video processing chains 350 and the video analysis processor 360.

As illustrated, each of the video processing chains includes a decoder 510-1, 510-2, . . . , 510-N for decoding video data of a stream, e.g., an RTP stream received from an RTP source. The decoders 510-1, 510-2, . . . , 510-N may for example be implemented as H.263 or H.264 decoders. The decoders 510-1, 510-2, . . . , 510-N decode the video data to obtain digital video signals, e.g., in the form of a sequence of video frames.

As illustrated, the video analysis processor 360 may include a video analysis engine 510 receiving the streams of video data corresponding to the different endpoints and optionally also a video history database (DB) 520. Using the video history database 520, the video analysis engine 520 may record the video signals or parameters evaluated therefrom for a certain period of time and/or over multiple communication sessions in order to maintain a history of the video data for each of the endpoints. The histories of the video data as maintained by the video history database may in turn be used by the video analysis engine 510 when performing the analysis of the video data, e.g., for determining the visual activity levels, identifying speakers, or determining the number of visible persons. The history of the video data of past communications sessions may for example be used to provide information on expected visual activity levels, numbers of visible persons, or possible speakers already at the beginning of a communication session.

From the video analysis engine 510, the video data of the different streams signals are supplied to a video selector 530 which may also be implemented as video mixer. By means of the video selector 530 a stream of video data corresponding to a certain endpoint can be mapped to a desired output stream so as to be shown at a desired location in the layout selected for the UI. Optionally, two video streams could also be mixed, e.g., combined into a single video stream by overlaying or the like. The video selector 530 is controlled by a video controller 550, which in turn may receive control signals from the UI controller 300. In this way, the UI controller 300 may also control at which location of the selected visual layout the video image of a certain stream is shown.

The encoders 560-1, 560-2, . . . , 560-N accomplish encoding of the selected or mixed video signals from the video selector 530 for transmission to the various endpoints. In particular, the video signals may be encoded into RTP streams corresponding to the different endpoints.

As further illustrated, the video controller 550 may also interact with a protocol controller 560, which for example may implement functionalities of Real Time Control Protocol (RTCP) handling and control of RTP transmissions.

Based on the information from the audio processing part and from the video processing part, the UI controller 300 may select an adequate layout to be used at the different endpoints of the communication session, e.g., from predefined layouts as illustrated in FIG. 2. One possibility is to use the same layout for all endpoints. Alternatively, the layout selection may be accomplished on a per-end point basis, i.e., each endpoint may be provided with an individually tailored layout. For example, for a monologue type communication session, the video image recorded at one endpoint can be shown large, while the video images recorded at the other endpoints are shown small, as in layout 12 of FIG. 2. For a dialogue type communication session with a group of for example two or three endpoints actively participating in the dialogue, the video images of all endpoints of the group could be shown with equal size and larger than the video images of other endpoints which are not actively participating in the dialogue, e.g., as in layout 13 of FIG. 2. That is to say, the video images corresponding to silent endpoints can be shown smaller. For a discussion type communication session, the video images of all endpoints can be shown in the same size. If an endpoint has high visual activity level, this endpoint might be considered as active in the layout selection as well, even if it is silent. The layout selection may be accomplished using a rule-based selection mechanism.

In some implementations, the layout selection could also be influenced by user inputs. For example, the user at an endpoint could select or define a layout irrespective of the layout that the automatic layout selection algorithm would select. The layout selection algorithm may also consider information with respect to the endpoint where the rendering of the UI shall take place, e.g., information on a number of screens, screen size, screen resolution, or subscription data of the user at the endpoint. The layout selection algorithm may also consider participants that are connected over a voice-only connection, e.g., using mobile phone dial-in. For example, this could be accomplished by showing an icon or static picture of the participant.

In some implementations, the above processing of the audio and video data by the MRFP 66 may be supplemented by additional processing steps. For example, MRFP 66 may include one or more advertisements or one or more information streams into the selected layout. Further, the MRFP 66 may include overlay information such as names of locations or names of participants into the selected layout. Further, the MRFP 66 may adapt the resolution of the video streams depending on the selected visual layout, e.g., by switching to a suitable available resolution not larger than necessary in view of the size of the corresponding video image in the visual layout. By using transcoding, the MRFP 66 could also generate a suitable resolution for the video stream. If transcoding is used, the MRFP 66 may be provided with a correspondingly configured transcoder.

The layout information and the streams of audio and video data as processed by the MRFP 66 are then conveyed to the endpoints. Each endpoint may then accomplish decoding of the video and audio data and rendering of the UI according to the control data received from the MRFP 66. In addition, the UI may be adapted or changed according to local policies or user inputs. In some implementations, the MRFP 66 may signal to the endpoints whether such local deviations from the layout generated by the MRFP 66 are allowed.

The overall process of controlling the UI may be adaptive. That is to say, representation of the endpoints in the UI may automatically change when the underlying conversational scenario of the communication session changes, e.g., from a monologue to a discussion as may for example occur at the end of a presentation.

Figure 6:
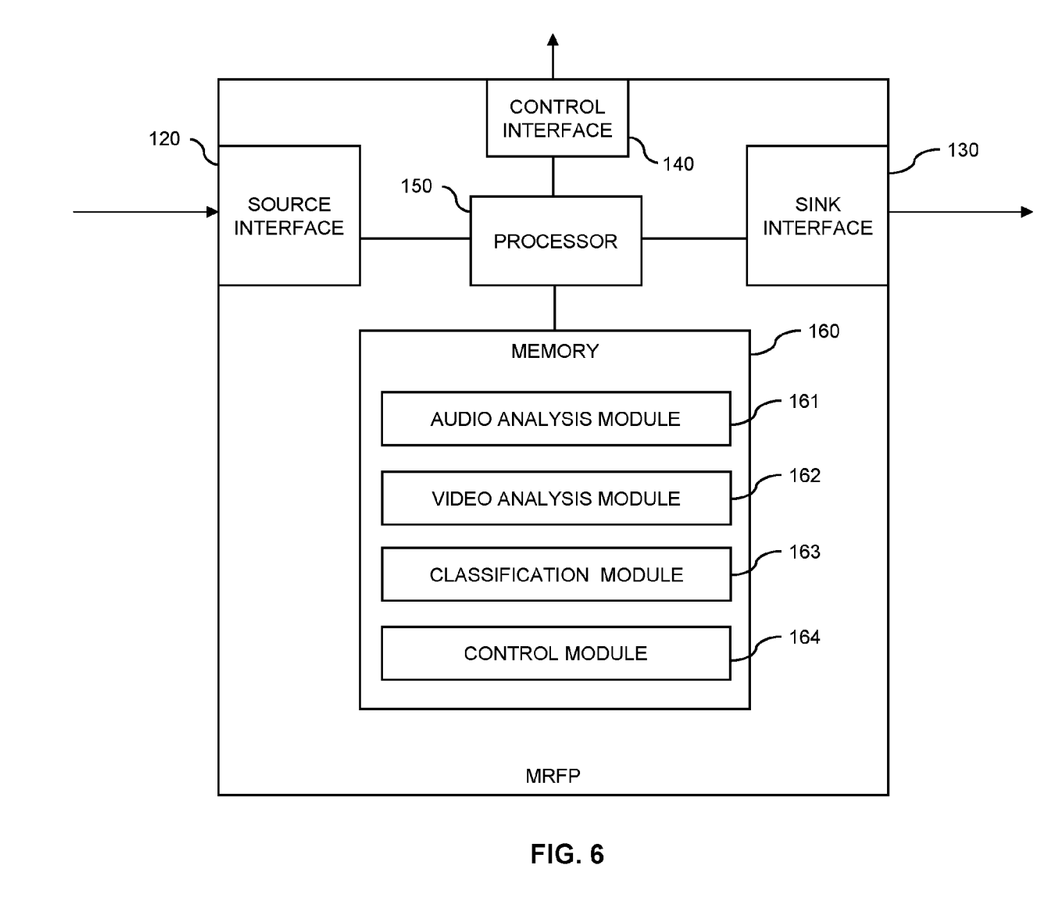
FIG. 6 schematically illustrates a processor-based implementation of the device.

FIG. 6 shows a processor-based implementation of the above-described device, i.e., of the MRFP 66. As illustrated, the device includes a number of interfaces, in particular a source interface 120 for receiving streams with audio and/or video data, a sink interface 130 for outputting streams with audio and/or video data, and a control interface 140 for sending control data to endpoints. In addition, the control interface 140 may also be used to receive control data from other components of the multimedia conference system, e.g., from the MRFC 56 of FIG. 1. As mentioned above, the source interface 120 and the sink interface 130 may be configured for transmissions of RTP streams.

In addition, the device includes a processor 150 and a memory 160 coupled to the processor 150. The memory 160 may include a read-only memory (ROM), e.g. a flash ROM, a random-access memory (RAM), e.g. a Dynamic RAM (DRAM) or static RAM (SRAM), a mass storage, e.g., a hard disk or solid state disk, or the like. The memory 160 includes suitably configured program code to be executed by the processor 150 so as to implement the above-described functionalities of the MRFP 66 in the multimedia conference system. More specifically, the memory 160 may include an audio analysis module so as to implement the above-described functionalities of the audio analysis processor 340. If also video analysis is implemented, the memory 160 may also include a video analysis module 162 so as to implement the above-described functionalities of the video analysis processor 360. In addition, the memory 160 may include a classification module so as to implement the above-described functionalities of the session type classification processor 310. Further, the memory 160 may also include a control module 164 so as to implement various control functionalities, in particular control of the representation of the endpoints in the UI as accomplished by the above-described UI controller 300.

It is to be understood that the structure as illustrated in FIG. 6 is merely schematic and that the device may actually include further components which, for the sake of clarity, have not been illustrated, e.g., hardware components dedicated to certain processing functionalities, such as hardware-implemented decoders or encoders. Also, it is to be understood that the memory 160 may include further types of program code modules, which have not been illustrated, e.g., program code modules for implementing known functionalities of a MRFP and at least some of the above-mentioned processing functionalities. According to some embodiments, also a computer program product may be provided for implementing concepts according to embodiments of the invention, e.g., a medium storing the program code to be stored in the memory 160.

Figure 7:
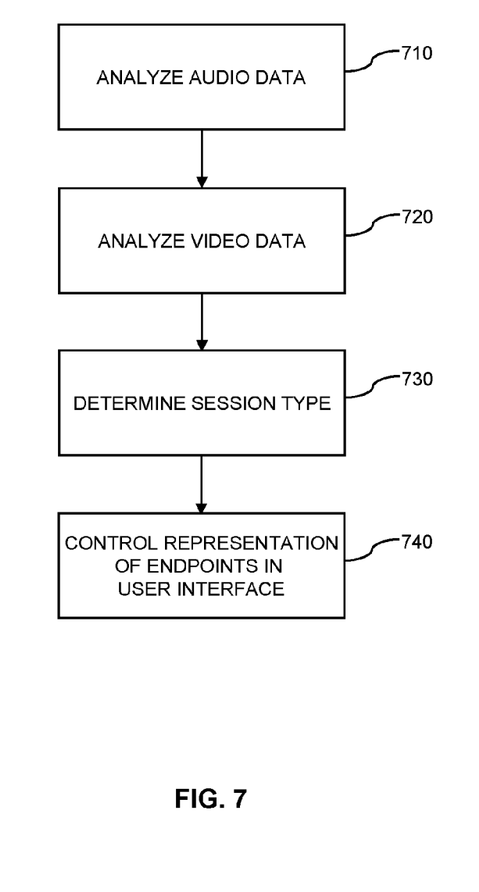
FIG. 7 shows a flowchart for illustrating a method according to an embodiment of the invention.

FIG. 7 shows a flowchart for illustrating a method of controlling a UI of a multimedia conference system. The method of FIG. 7 may be used to implement the above-described concepts of controlling the representation of endpoints of a communication session depending on the underlying conversational scenario, i.e., the type of the communication session. The method may in particular be implemented in the above-described MRFP 66.

At step 710, audio data of the communication session are analyzed, e.g., by the audio analysis processor 340. The analysis of the audio data may include measuring an audio activity level in the audio data of each endpoint and sorting the endpoints by the measured audio activity level. The audio activity level may be measured on the basis of a history of audio data maintained for each of the endpoints.

At optional step 720, video data of the communication session are analyzed, e.g., by the video analysis processor 360. The analysis of the video data may include measuring a visual activity level for each of the endpoints. Further, the analysis of the video data may include determining a speaker among multiple visible persons and/or determining a number of visible persons.

At step 730, the type of the communication session is determined, e.g., by the session type classification processor 310. The determination of the type of the communication session is accomplished on the basis of the analysis of the audio data performed at step 710. When using optional step 720, the type of the communication session may be additionally determined on the basis of the analysis of the video data performed at step 720.

At step 740, the representation of the endpoints in the UI is controlled, e.g., by the UI controller 300. This may in particular be accomplished by sending control data to the endpoints, but also by internal control procedures within the MRFP 66, e.g., by acting on the audio mixer 430 or on the video controller 550 as explained above. When using optional step 720, the representation of the endpoints in the user interface may be additionally controlled on the basis of the analysis of the video data as performed at step 720, e.g., by highlighting an identified speaker, zooming onto an identified speaker, and/or adapting the visual layout of the UI to the number of determined persons.

The representation of the endpoints in the UI may be controlled by controlling rendering of the video data. This may be accomplished by selecting between a number of predefined visual layouts for the UI, such as the layouts 11, 12, 13, 14 of FIG. 2. Additionally or as an alternative, the rendering of the video data may also be controlled by acting on the video controller 550. Further, the representation of the endpoints in the UI may be controlled by controlling rendering of the audio data. For example, this may be accomplished by determining a multi-channel audio configuration for rendering of the audio data, e.g., by mapping the audio data to left and right audio channels.

Accordingly, the concepts as explained above allow for selection of visual layouts for the UI not only on the basis of current audio activity, but based on a certain history of the voice activity, and optionally also on the basis of video analysis. By using the audio analysis and optionally also video analysis as explained above, a visual layout for the UI can be chosen according to the underlying conversational scenario, e.g., dialogue, monologue, lecture, or discussion. For example, if there is a dialogue between two endpoints, it may be more adequate to show both of them in equal size, even though normally only one of the endpoints is speaking at the time. Accordingly, the layout of the UI may be automatically adapted to the conversational scenario.

It is to be understood that the examples and embodiments as explained above are merely illustrative and susceptible to various modifications. For example, the concepts could be used in other types of mobile network than a mobile network according to the 3GPP TSs. Also, the concepts may be combined with various other mechanisms of controlling the UI of the multimedia conference system, e.g., with concepts of manual control or other automatic control mechanisms. Further, it is to be understood that the above concepts may be implemented by using correspondingly designed software to be executed by a processor of an existing device, or by using dedicated device hardware.

The invention claimed is:

1. A method of controlling a user interface of a multimedia conferencing system, the method comprising:
analyzing audio data of a communication session with multiple participating endpoints;
on the basis of the said analyzing of the audio data, determining a type of the communication session; and
on the basis of the determined type of the communication session, controlling a representation of the endpoints in the user interface,
wherein said analyzing the audio data comprises measuring an audio activity level in the audio data of each endpoint and sorting the endpoints by the measured audio activity level, and
wherein said determining the type of the communication session comprises at least one of:
determining whether the sum of the audio activity levels of a group of the endpoints having the highest audio activity levels is above a first threshold and the audio activity levels of each of the endpoints of this group are above a second threshold, and
determining whether the difference between the audio activity level of the endpoint having the highest audio activity level and the audio activity level of the endpoint having the lowest audio activity level is below a third threshold.

2. The method according to claim 1, wherein said determining the type of the communication session comprises determining whether the audio activity level of the endpoint having the highest activity level is above a fourth threshold.

3. The method according to claim 1, wherein the audio activity level is measured on the basis of a history of audio data maintained for each endpoint.

4. The method according to claim 1, comprising:
analyzing video data of the communication session; and
determining the type of the communication session additionally on the basis of said analyzing of the video data.

5. The method according to claim 1, comprising:
analyzing video data of the communication session; and
controlling the representation of the endpoints in the user interface additionally on the basis of said analyzing of the video data.

6. The method according to claim 4, comprising:
wherein said analyzing the video data comprises measuring a visual activity level for each of the endpoints.

7. The method according to claim 4, wherein said analyzing the video data comprises determining a speaker among multiple visible persons.

8. The method according to claim 4, wherein said analyzing the video data comprises determining a number of visible persons.

9. The method according to claim 1, wherein said controlling the representation comprises sending control data to at least one of the endpoints.

10. The method according to claim 1, wherein said controlling the representation of the endpoints in the user interface comprises controlling rendering of the video data.

11. The method according to claim 10, wherein said controlling comprises selecting between a number of predefined visual layouts of the user interface.

12. The method according to claim 1, wherein said controlling the representation of the endpoints in the user interface comprises controlling rendering of the audio data.

13. The method according to claim 12, wherein said controlling the representation of the endpoints in the user interface comprises determining a multi-channel audio configuration for said rendering of the audio data.

14. A device for a multimedia conferencing system, the device comprising:
an audio analysis processor configured to analyze audio data of a communication session with multiple participating endpoints;
a session type classification processor configured to determine a type of the communication session on the basis of the analysis of the audio data; and
a user interface controller configured to control a representation of the endpoints in a user interface on the basis of the determined type of the communication session,
wherein said analysis of the audio data comprises measuring an audio activity level in the audio data of each endpoint and sorting the endpoints by the measured audio activity level, and
wherein said determination of the type of the communication session comprises at least one of:
determining whether the sum of the audio activity levels of a group of the endpoints having the highest audio activity levels is above a first threshold and the audio activity levels of each of the endpoints of this group are above a second threshold, and
determining whether the difference between the audio activity level of the endpoint having the highest audio activity level and the audio activity level of the endpoint having the lowest audio activity level is below a third threshold.

15. The device according to claim 14, further comprising:
a video analysis processor configured to analyze video data of the communication session.

16. The device according to claim 14, comprising:
a control interface for sending control data defining the representation of the endpoints in the user interface to at least one endpoint of the communication session.

17. A non-transitory computer program product comprising program code to be executed by a processor of a device, which, when executed, causes the device to perform a method as defined by claim 1.

* * * * *

UNITED STATES PATENT AND TRADEMARK OFFICE
CERTIFICATE OF CORRECTION

| | | |
|---|---|---|
| PATENT NO. | : 9,143,728 B2 | Page 1 of 1 |
| APPLICATION NO. | : 14/345867 | |
| DATED | : September 22, 2015 | |
| INVENTOR(S) | : Hartung et al. | |

It is certified that error appears in the above-identified patent and that said Letters Patent is hereby corrected as shown below:

In the Specification

In Column 3, Line 30, delete "S-CSCF 65" and insert -- S-CSCF 64 --, therefor.

In Column 3, Line 37, delete "S-CSCF 65" and insert -- S-CSCF 64 --, therefor.

In Column 7, Line 7, delete "engine 440" and insert -- engine 430 --, therefor.

In Column 7, Line 63, delete "engine 520" and insert -- engine 510 --, therefor.

In Column 10, Line 45, delete "mixer 430" and insert -- mixer 450 --, therefor.

In the Claims

In Column 12, Line 56, in Claim 16, delete "data" and insert -- data (CD) --, therefor.

Signed and Sealed this
Nineteenth Day of April, 2016

Michelle K. Lee
*Director of the United States Patent and Trademark Office*